(12) United States Patent
Hashimoto et al.

(10) Patent No.: US 6,252,987 B1
(45) Date of Patent: Jun. 26, 2001

(54) IMAGE DATA CODING BY PATTERN MATCHING

(75) Inventors: Tamae Hashimoto; Kou-ichirou Hirao, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/145,467

(22) Filed: Sep. 2, 1998

(30) Foreign Application Priority Data

Sep. 2, 1997 (JP) ................................... 9-237129

(51) Int. Cl.⁷ ........................................ G06K 9/62
(52) U.S. Cl. .................................................. 382/209
(58) Field of Search .................... 382/209, 213, 382/216, 220, 232, 235, 253, 217, 218, 219, 229, 256; 345/186, 199

(56) References Cited

U.S. PATENT DOCUMENTS

| 4,542,378 | * | 9/1985 | Suganuma et al. | 340/734 |
| 5,278,671 | * | 1/1994 | Takahashi et al. | 358/456 |
| 5,668,897 | * | 9/1997 | Stolfo | 382/283 |
| 5,684,895 | * | 11/1997 | Harrington | 382/233 |

FOREIGN PATENT DOCUMENTS 63-184479    7/1988 (JP).

OTHER PUBLICATIONS

Howard; "Lossless and Lossy Compression of Text Images by Soft Pattern Matchin"; AT&T Bell Laboratories; Jun. 30, 1995.

* cited by examiner

Primary Examiner—Andrew W. Johns
Assistant Examiner—Seyed H. Azarian
(74) Attorney, Agent, or Firm—Foley & Lardner

(57) ABSTRACT

In an image coding system, a library of reference patterns is stored for reference and the input pattern is matched with a reference pattern selected from the library to find a best reference pattern. An error map of the input pattern is produced with respect to the best reference pattern and then it is determined whether an error pattern of the error map meets a predetermined criterion which provides a discrimination from an error caused by a pattern difference between the input pattern and the best reference pattern. If the error pattern meets the predetermined criterion, the error pattern is deleted from the input pattern and then the modified input pattern is predictive-coded referring to the best reference pattern.

19 Claims, 4 Drawing Sheets

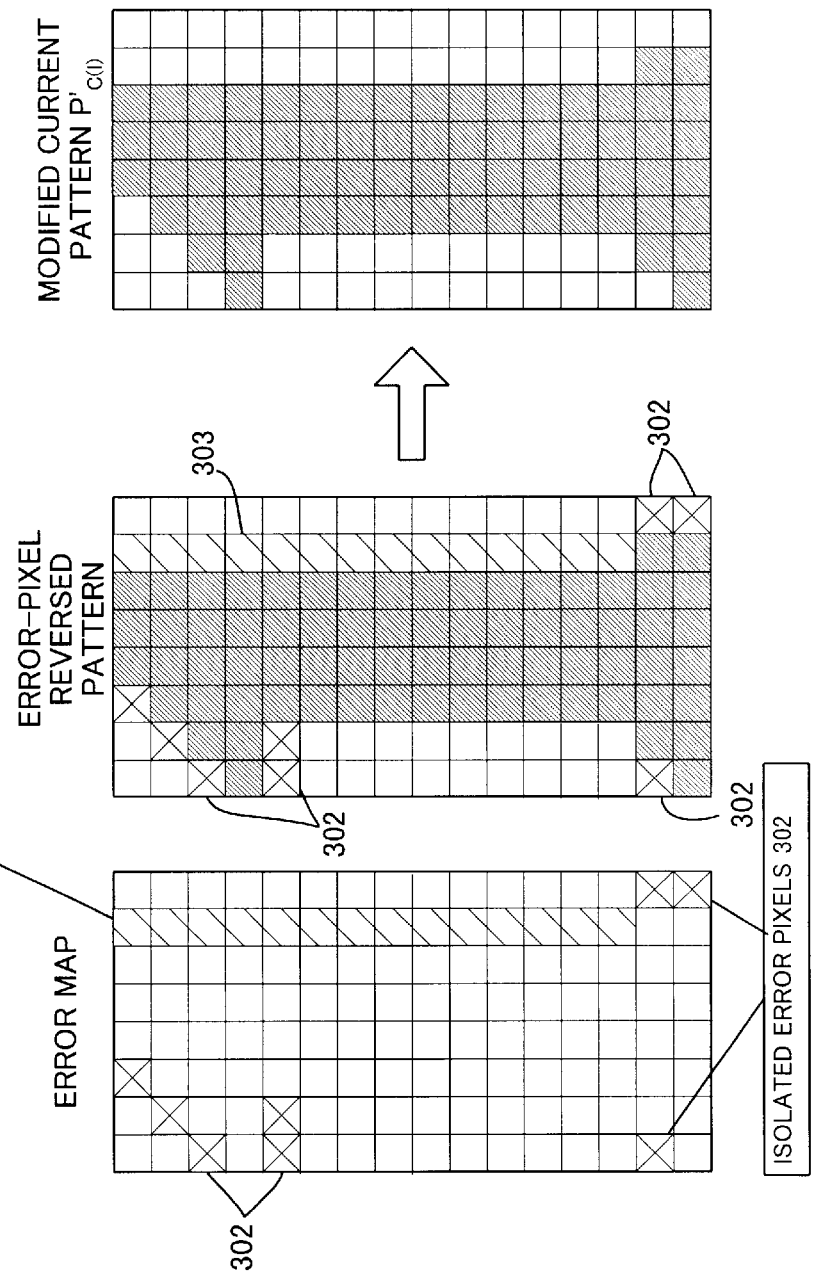

IMAGE DATA CODING BY PATTERN MATCHING

BACKGROUND OF THE INVENTION

1. Field of the Invention

The present invention generally relates to an image data coding system, and in particular to method and apparatus for coding an image including repeatedly usable patterns using a pattern matching technique.

2. Description of the Related Art

There have been proposed several image coding or compression techniques using pattern matching. For example, see "Lossless and Lossy Compression of Text Images by Soft Pattern Matching" by Paul G. Howard ("Coding of Still Pictures" ISO/IEC JTC 1/SC 29/WG1, Jun. 30, 1995). According to the conventional compression technique, an input image is segmented into marks or patterns, each of which is compared with the patterns stored in a library. If the current pattern matches one of the patterns of the library, then an index of the matching pattern is coded based on the bitmap and the size of the current pattern and its offset relative of another previously coded pattern.

In the case where pixels surrounding the current pattern are predicted in value (black or white), a differential value between the current pattern and each of reference patterns is calculated where the reference patterns are selected by pattern matching. The reference pattern having the minimum differential value is used for prediction.

However, there is a possibility that the differential value is affected by variations in matching position and thickness of a line of the current pattern. Such variations may cause an erroneous reference pattern to be selected and used for prediction, resulting in inaccurate pattern matching coding.

SUMMARY OF THE INVENTION

An object of the present invention is to provide a pattern matching coding method and apparatus that can achieve data coding or compression with accuracy and reliability.

According to an aspect of the present invention, a library of reference patterns is stored for reference and the input pattern is matched with a reference pattern selected from the library to find a best reference pattern for the input pattern, wherein a pattern area of the input pattern is equal to that of the reference pattern. An error map of the input pattern is produced with respect to the best reference pattern and then it is determined whether an error pattern of the error map meets a predetermined criterion which provides a discrimination from an error caused by a pattern difference between the input pattern and the best reference pattern. If the error pattern meets the predetermined criterion, the error pattern is deleted from the input pattern to produce a modified input pattern. And the modified input pattern is coded referring to the best reference pattern.

The error pattern meets the predetermined criterion when a ratio of the error pattern to the pattern area is smaller than a predetermined threshold or when the error pattern consists of error pixels which are continuously connected in at least one single-pixel line extending in a direction.

The error pattern may be a minute error of the input pattern with respect to the best reference pattern, wherein the predetermined criterion is set so that the minute error is discriminated from an error caused by a pattern difference between the input pattern and the best reference pattern. The error pattern may be caused by variations in at least one of line thickness of the input pattern and position of the input pattern with respect to the best reference pattern when matching.

As described above, when the error pattern meets the predetermined criterion which provides a discrimination from an error caused by a pattern difference between the input pattern and the best reference pattern, the error pattern is deleted from the input pattern to produce a modified input pattern and then the modified input pattern is coded referring to the best reference pattern. Therefore, an error caused by variations in line thickness of the current pattern and/or variations in matching position can be eliminated, resulting in accurate and reliable image coding or compression.

BRIEF DESCRIPTION OF THE DRAWINGS

FIG. 4A is a diagram showing the error map from which isolated error pixels and a line of connected error pixels are detected;

FIG. 4B is a diagram showing an error-pixel reversed current pattern; and

FIG. 4C is a diagram showing a modified current pattern produced by reversing error pixels.

DETAILED DESCRIPTION OF THE PREFERRED EMBODIMENTS

Figure 1:
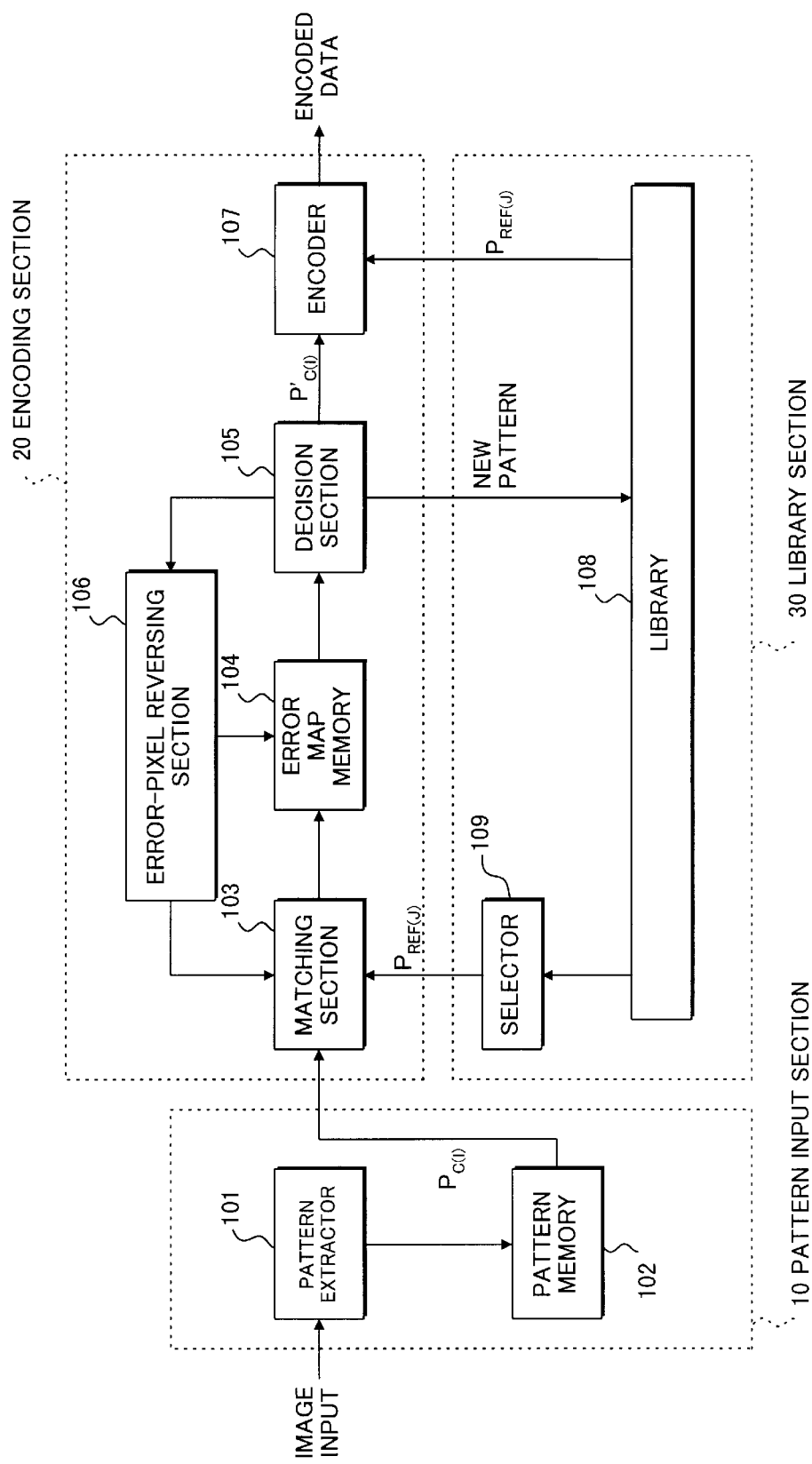
FIG. 1 is a block diagram showing the functional configuration of a pattern matching coding system according to an embodiment of the present invention.

Referring to FIG. 1, a pattern matching coding apparatus according to the present invention is comprised of a pattern input section 10, a coding section 20 and a library section 30. The pattern input section 10 includes a pattern extractor 101 and a pattern memory 102. The pattern extractor 101 receives an input image including repeatedly usable patterns such as characters, and extracts input patterns using a border-following (or boundary-tracing) method and the like. Each of input patterns consists of connected components of black pixels in a pixel matrix. The extracted input patterns are stored onto the pattern memory 102. The patterns are sequentially output to the coding section 20.

The coding section 20 may be implemented with hardware and, alternatively, with a program-controlled processor running a pattern matching coding program as will be described later. The coding section 20 includes a matching section 103 that compares the input pattern $P_{C(I)}$ received from the pattern memory 102 with a selected reference pattern $P_{REF(J)}$ received from the library section 30. The mismatched pixels between the input pattern $P_{C(I)}$ and the selected reference pattern $P_{REF(J)}$ are stored onto an error map memory 104.

The coding section 20 further includes a decision section 105 which performs modifications of minor errors including minute variations in thickness of lines using an error-pixel reversing section 106 under a predetermined condition as will be described later. In the case where the best matching reference pattern $P_{REF(J)}$ is not acceptable, the decision section 105 determines that the input pattern $P_{C(I)}$ is a new pattern and then stores it onto the library section 30. If the best matching reference pattern $P_{REF(J)}$ is acceptable, the decision section 105 outputs the modified input pattern P'$_{C(I)}$ to an encoder 107 which performs predictive-coding of the modified input pattern P'$_{C(I)}$ referring to the best matching reference pattern P$_{REF(J)}$.

The library section 30 includes a library 108 storing previously coded patterns for later reference and a selector 109 which selects one of the stored patterns and outputs the selected pattern as a reference pattern to the matching section 103 of the coding section 20.

PATTERN MATCHING CODING CONTROL

The coding control using pattern matching is carried out by the coding section 20 that may be implemented with the program-controlled processor running the pattern matching coding program.

Figure 2:
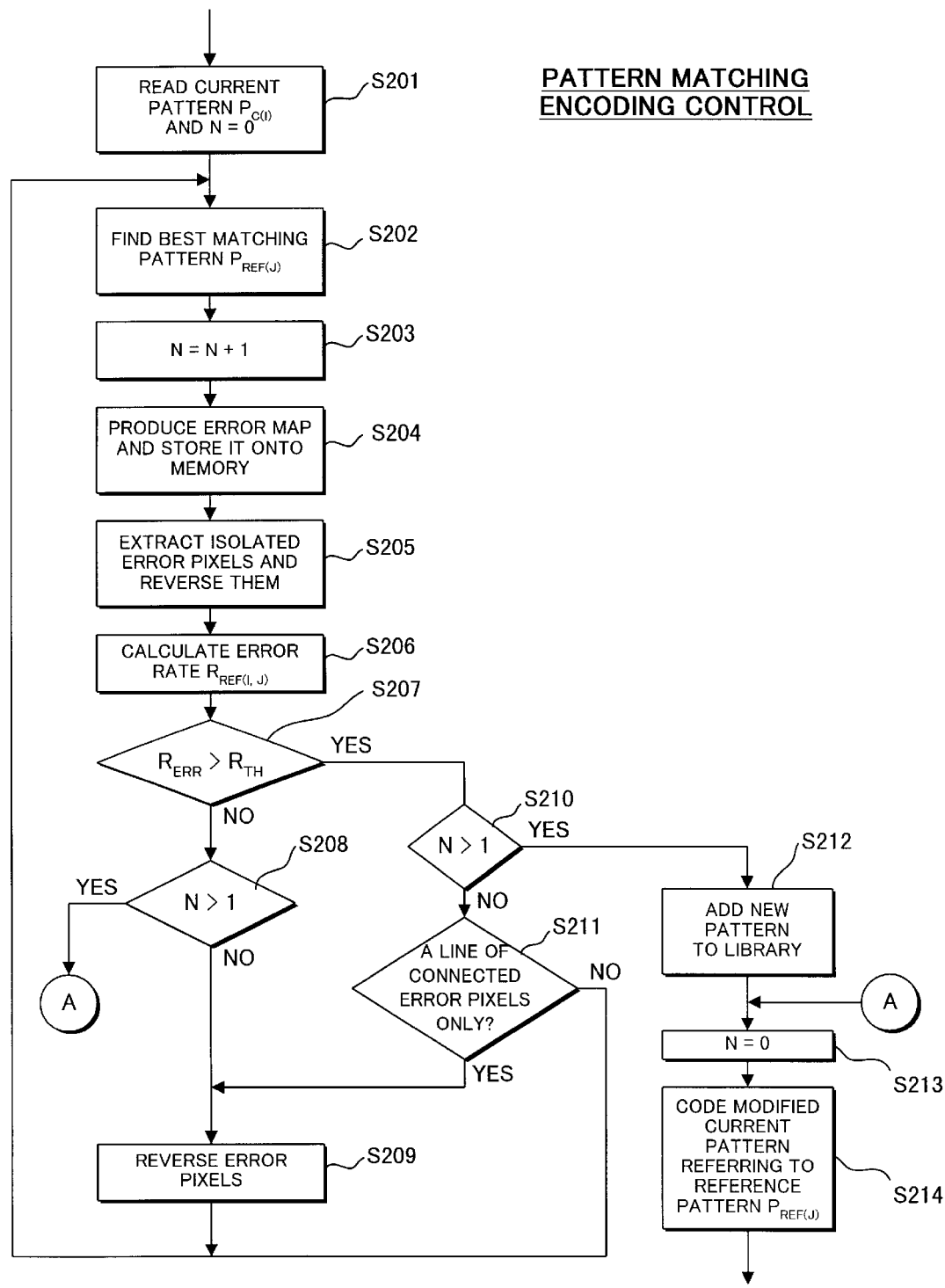
FIG. 2 is a flow chart showing a pattern matching coding method according to the embodiment.

Referring to FIG. 2, when reading a current pattern P$_{C(I)}$ in units of the pixel matrix from the pattern memory 102 and initializing a variable N (steps S201), the matching section 103 finds a best matching reference pattern P$_{REF(J)}$ from previously added patterns selected by the selector 109 (step S202). After incrementing the variable N by one (step S203), the matching section 103 produces an error map between the current pattern P$_{C(I)}$ and the reference pattern P$_{REF(J)}$ and stores it onto the error map memory 104 (step S204).

Subsequently, the decision section 105 detects isolated error pixels from the error map stored in the error map memory 104 and then corrects the error map by reversing the values of the isolated error pixels from black to white (step S205). In the embodiment, the concept of isolated error pixel includes not only one isolated error pixel but also two connected error pixels. Three or more connected error pixels in a direction are recognized as a line of connected error pixels as will be described later.

Thereafter, the decision section 105 calculates an error rate R$_{ERR(I,J)}$ of the corrected error pixels by dividing the number of error pixels by that of all the pixels of the pattern area or pixel matrix (step S206). The decision section 105 determines whether the error rate R$_{ERR(I,J)}$ is greater than a predetermined threshold R$_{TH}$ (step S207).

If the error rate R$_{ERR(I,J)}$ is not greater than the predetermined threshold R$_{TH}$ (NO in step S207), then it is determined whether the variable N is greater than 1 (step S208) and, when N is not greater than 1 (NO in step S208), the error pixels are reversed (step S209). In other words, when R$_{ERR(I,J)} \leq$ R$_{TH}$, it is determined that the difference between the current pattern P$_{C(I)}$ and the reference pattern P$_{REF(J)}$ is sufficiently small. By setting the predetermined threshold R$_{TH}$ to an appropriate value, the pixel error caused by variations in line thickness and/or matching position can be discriminated from the pixel error caused by a pattern difference between the current pattern P$_{C(I)}$ and the reference pattern P$_{REF(J)}$.

If the error rate R$_{ERR(I,J)}$ is greater than the predetermined threshold R$_{TH}$ (YES in step S207), then it is determined whether the variable N is greater than 1 (step S210) and, when N is not greater than 1 (NO in step S210), the decision section 105 determined whether the error pixels are continuously connected in one or more single-pixel line extending in a direction (step S211). If the error pixels are continuously connected in one or more single-pixel line extending in a direction (YES in step S211), then the error pixels are reversed (step S209). In other words, in the case where the error pixels are connected from one to another to form one or more single-pixel line and the error map consists of one or more lines of connected error pixels only, it can be determined that such an error is caused by variations in line thickness of the current pattern P$_{C(I)}$ and/or variations in position of the current pattern P$_{C(I)}$ with respect to the reference pattern P$_{REF(J)}$. Therefore, such an error can be deleted even though the error rate R$_{ERR(I,J)}$ is greater than the predetermined threshold R$_{TH}$ (YES in step S207).

After the error pixels have been reversed (step S209) or when the error pixels are not connected from one to another in a single-pixel line extending in a direction (NO in step S211), the control goes back to the step S202 to find a best matching reference pattern. In the case where the error map includes a double-pixel line for instance, it is determined that the error map includes only one or more single-pixel line extending in a direction (NO in step S211). Then the steps S203–S207 are performed again using the found reference pattern.

When the error rate R$_{ERR(I,J)}$ is greater than the predetermined threshold R$_{TH}$ (YES in step S207) and the variable N is greater than 1 at this time (YES in step S210), then it is determined that an acceptable match is not found and the current pattern P$_{C(I)}$ is new. Therefore, the current pattern P$_{C(I)}$ is added as a new pattern to the library 108 (step S212). When the error rate R$_{ERR(I,J)}$ is not greater than the predetermined threshold R$_{TH}$ (NO in step S207) and the variable N is greater than 1 at this time (YES in step S208), then it is determined that an acceptable match is found.

When the current pattern P$_{C(I)}$ is added as a new pattern to the library 108 (step S212) or when the variable N is greater than 1 at this time (YES in step S208), the variable N is reset to 0 (step S213) and then the endcoder 107 performs predictive-coding of the modified input pattern P'$_{C(I)}$ referring to the best matching reference pattern P$_{REF(J)}$ (step S214). The steps S201–S214 are repeatedly performed for each of the current patterns stored in the pattern memory 102.

EXAMPLE

Figure 3A:
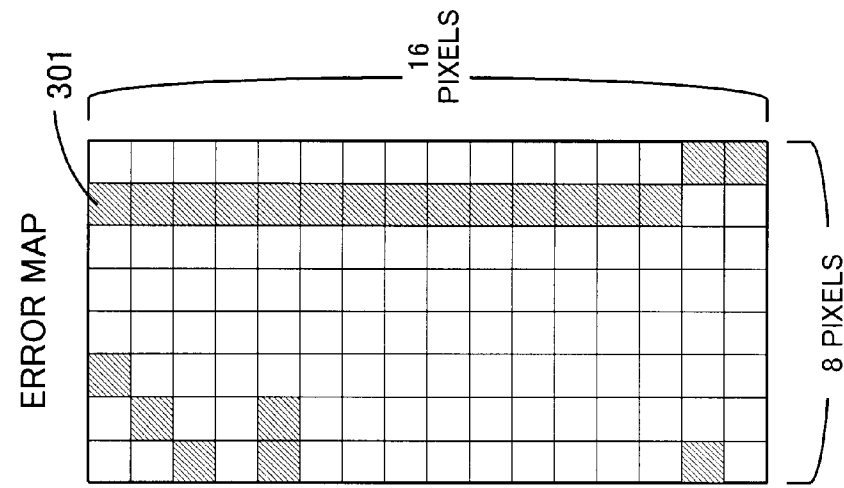
FIG. 3A is a diagram showing an example of reference pattern.
Figure 3B:
FIG. 3B is a diagram showing an example of current pattern.

Referring to FIGS. 3A and 3B, it is assumed that the matching section 103 receives a best reference pattern P$_{REF(J)}$ of 8×16-pixel bitmap data indicating the reference form of "1" and a current pattern P$_{C(I)}$ of 8×16-pixel bitmap data indicating the form of "1". Needless to say, the pattern area of 8×16 pixels is just an example.

Figure 3C:
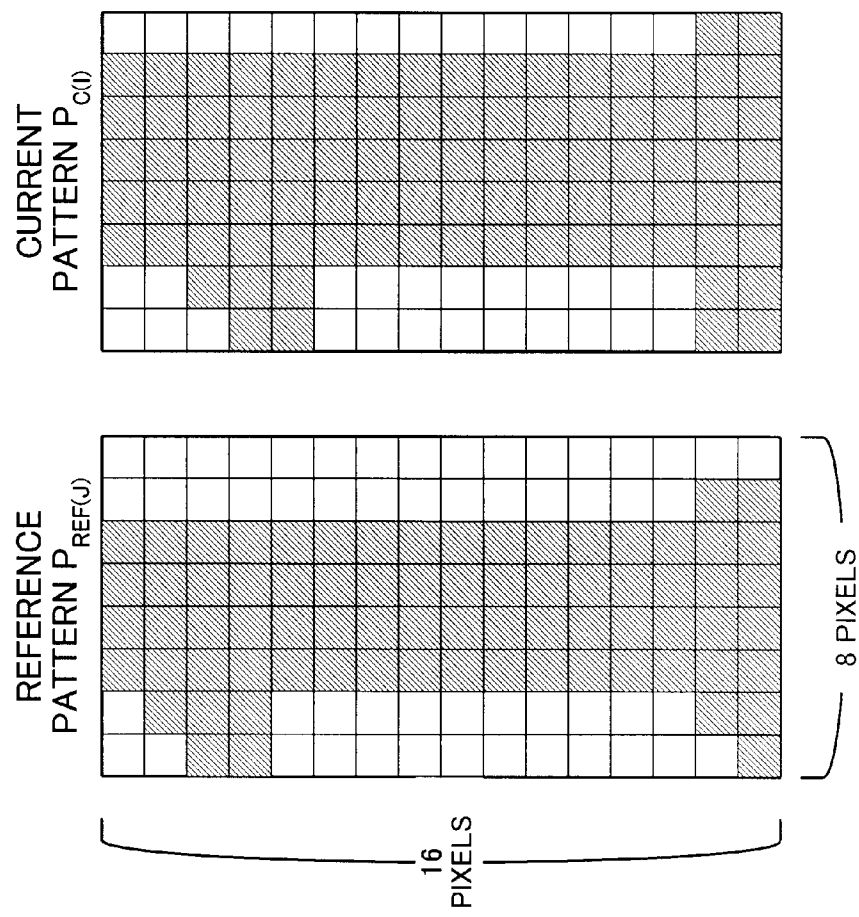
FIG. 3C is a diagram showing an error map produced from the reference and current patterns as shown in FIGS. 3A and 3B.

Referring to FIG. 3C, the matching section 103 produces an error map including 22 error pixels 301 by comparing the best reference pattern P$_{REF(J)}$ with the current pattern P$_{C(I)}$ and stores it onto the error map memory 104.

Referring to FIGS. 4A–4C, the decision section 105 detects eight isolated error pixels 302 from the error map and then reverses the values of the eight isolated error pixels 302 from black to white. Therefore, there are 14 error pixels left in the error map. Thereafter, the decision section 105 calculates an error rate R$_{ERR}$ of the remaining error pixels by dividing the number of error pixels by that of all the pixels of the pixel matrix or pattern area. In this example, the number of error pixels is 14 and the number of all the pixels of the pixel matrix is 8×16=128. Therefore, the error rate R$_{ERR}$ is about 11% which is calculated by 14/128.

The decision section 105 determines whether the error rate R$_{ERR(I,J)}$ is greater than a predetermined threshold R$_{TH}$ which is set to, for example, 9% so as to provide a discrimination between the pixel error caused by variations in line thickness and/or matching position and the pixel error caused by a pattern difference between the current pattern P$_{C(I)}$ and the reference pattern P$_{REF(J)}$. If the error rate R$_{ERR(I,J)}$ is not greater than the predetermined threshold R$_{TH}$, the error pixels are reversed in the current pattern as shown in FIG. 4B.

In the case where the error rate $R_{ERR(I,J)}$ is greater than the predetermined threshold $R_{TH}$, it is further determined whether the error pixels are continuously connected in a single-pixel line extending in a direction. If so, the error pixels are reversed in the current pattern as shown in FIG. 4B.

In this example of FIG. 4A, since the error rate $R_{ERR}=11\%$ is greater than 9% (YES in step S207) and the remaining error pixels 303 are continuously connected in a single-pixel line in the vertical direction (YES in step S211), all the error pixels are reversed (step S209). After the error pixels are reversed, there would be no error pixels except for isolated error pixels. Since the isolated error pixels are reversed (step S205), the modified current pattern $P'_{C(I)}$ as shown in FIG. 4C is obtained and is predictive-coded referring to the reference pattern (step 214).

What is claimed is:

1. A method for coding an input pattern by pattern matching, comprising the steps of:

storing a library of reference patterns;

matching the input pattern with a reference pattern selected from the library to find a best reference pattern for the input pattern, wherein a pattern area of the input pattern is equal to that of the reference pattern;

producing an error map of the input pattern with respect to the best reference pattern;

determining an error value of said error map based on the amount of mismatch between the error map and the best referencee pattern;

determining whether said error value exceeds a predetermined threshold;

if said error value does not exceed said predetermined threshold, then, deleting said error patterns from the input pattern to produce a modified input pattern, and if the error value exceeds said predetermined threshold, then, determining whether an error pattern of the error map meets a predetermined criterion which provides a discrimination from an error caused by a pattern difference between the input pattern and the best reference pattern, and if said error pattern does meet said predetermined criteria, then;

deleting the error pattern from the input pattern to produce an adapted input pattern; and coding one of said modified and adapted input patterns.

2. The method according to claim 1, wherein the error pattern is a minute error of the input pattern with respect to the best reference pattern, wherein the predetermined criterion is set so that the minute error is discriminated from an error caused by a pattern difference between the input pattern and the best reference pattern.

3. The method according to claim 1, wherein the error value exceeds said predetermined threshold when a ratio of the error pattern to the best reference pattern area is smaller than a predetermined threshold.

4. The method according to claim 1, wherein the error pattern meets the predetermined criterion when the error pattern consists of error pixels which are continuously connected in at least one single-pixel line extending in a direction.

5. The method according to claim 1, wherein the error pattern is caused by variations in line thickness of the input pattern.

6. The method according to claim 1, wherein the error pattern is caused by variations in position of the input pattern with respect to the best reference pattern when matching.

7. The method according to claim 1, wherein the error pattern includes an isolated error pixel and the method further includes the step of deleting the isolated error pixels before determining whether the error value exceeds the predetermined threshold.

8. A method for coding an input pattern referring to a best reference pattern selected from a library of reference patterns, comprising the steps of:

a) matching the input pattern with a reference pattern selected from the library to find a first best reference pattern for the input pattern, wherein a pattern area of the input pattern is equal to that of the reference pattern;

b) producing a first error map of the input pattern with respect to the first best reference pattern;

c) deleting at least one isolated error pixel from the first error map;

d) determining whether an error pattern of the first error map meets a predetermined criterion which provides a discrimination from an error caused by a pattern difference between the input pattern and the best reference pattern;

e) deleting the at least one isolated error pixel from the input pattern to produce a modified input pattern when the error pattern meets the predetermined criterion;

f) matching the modified input pattern with a reference pattern selected from the library to find a second best reference pattern for the modified input pattern;

g) producing a second error map of the modified input pattern with respect to the second best reference pattern;

h) deleting at least one isolated error pixel from the second error map;

i) determining whether an error pattern of the second error map meets the predetermined criterion; and j) coding the modified input pattern referring to the second best reference pattern when the error pattern of the second error map meets the predetermined criterion.

9. The method according to claim 8, wherein the predetermined criterion is a predetermined threshold that is used to determine whether a ratio of the error pattern of the first error map to the pattern area is smaller than the predetermined threshold.

10. The method according to claim 8, wherein the predetermined criterion is such that the error pattern of the first error map consists of error pixels which are continuously connected in at least one single-pixel line extending in a direction.

11. The method according to claim 8, wherein the error pattern of the first error map is caused by variations in line thickness of the input pattern.

12. The method according to claim 8, wherein the error pattern of the first error map is caused by variations in position of the input pattern with respect to the best reference pattern when matching.

13. An apparatus for coding an input pattern by pattern matching, comprising:

a library storing a plurality of reference patterns;

a matching section for matching the input pattern with a reference pattern selected from the library to find a best reference pattern for the input pattern, wherein a pattern area of the input pattern is equal to that of the reference pattern;

a memory for storing an error map of the input pattern with respect to the best reference pattern; and a processor for deleting isolated pixel errors of the error map and for subsequently determining whether a remaining error pattern of the error map meets a predetermined criterion which provides a discrimination from an error caused by a pattern difference between the input pattern and the best reference pattern, deleting the remaining error pattern meets the predetermined criterion, and coding the modified input pattern referring to the best reference pattern.

14. The apparatus according to claim 13, wherein the remaining error pattern is a minute error of the input pattern with respect to the best reference pattern, wherein the predetermined criterion is set so that the minute error is discriminated from an error caused by a pattern difference between the input pattern and the best reference pattern.

15. The apparatus according to claim 13, wherein the remaining error pattern meets the predetermined criterion when a ratio of the error pattern to the pattern area is smaller than a predetermined threshold.

16. The apparatus according to claim 13, wherein the remaining error pattern meets the predetermined criterion when the error map consists of error pixels which are continuously connected in at least one single-pixel line extending in a direction.

17. The apparatus according to claim 13, wherein the remaining error pattern is caused by variations in at least one of line thickness of the input pattern and position of the input pattern with respect to the best reference pattern when matching.

18. An information medium storing a computer program for coding an input pattern by pattern matching, the computer program operative for:

storing a library of reference patterns;

matching the input pattern with a reference pattern selected from the library to find a best reference pattern for the input pattern, wherein a pattern area of the input pattern is equal to that of the reference pattern;

producing an error map of the input pattern with respect to the best reference pattern;

deleting isolated pixel errors of the error map; and then, determining whether a remaining error pattern of the error map meets a predetermined criterion which provides a discrimination from an error caused by a pattern difference between the input pattern and the best reference pattern;

deleting the remaining error pattern from the input pattern to produce a modified input pattern if the error pattern meets the predetermined criterion; and coding the modified input pattern referring to the best reference pattern.

19. An information medium storing a computer program for coding an input pattern referring to a best reference pattern selected from a library of reference patterns, the computer program operative for:

a) matching the input pattern with a reference pattern selected from the library to find a first best reference pattern for the input pattern, wherein a pattern area of the input pattern is equal to that of the reference pattern;

b) producing a first error map of the input pattern with respect to the first best reference pattern;

c) deleting an isolated error pixel from the first error map;

d) determining whether an error pattern of the first error map meets a predetermined criterion which provides a discrimination from an error caused by a pattern difference between the input pattern and the best reference pattern;

e) deleting the isolated error pixel from the input pattern to produce a modified input pattern when the error pattern meets the predetermined criterion;

f) matching the modified input pattern with a reference pattern selected from the library to find a second best reference pattern for the modified input pattern;

g) producing a second error map of the modified input pattern with respect to the second best reference pattern;

h) deleting an isolated error pixel from the second error map;

i) determining whether an error pattern of the second error map meets the predetermined criterions; and j) coding the modified input pattern referring to the second best reference pattern when the error pattern of the second error map meets the predetermined criterion.

* * * * *